United States Patent
Connell, II et al.

(10) Patent No.: US 11,361,637 B2
(45) Date of Patent: Jun. 14, 2022

(54) GUNSHOT DETECTION SYSTEM WITH AMBIENT NOISE MODELING AND MONITORING

(71) Applicant: Johnson Controls Fire Protection LP, Boca Raton, FL (US)

(72) Inventors: Thomas Wysong Connell, II, Westminster, MA (US); Alan Levin, III, Bolton, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/968,937

(22) PCT Filed: Feb. 14, 2019

(86) PCT No.: PCT/IB2019/051207
§ 371 (c)(1),
(2) Date: Aug. 11, 2020

(87) PCT Pub. No.: WO2019/159103
PCT Pub. Date: Aug. 22, 2019

(65) Prior Publication Data
US 2021/0049881 A1    Feb. 18, 2021

Related U.S. Application Data

(60) Provisional application No. 62/637,161, filed on Mar. 1, 2018, provisional application No. 62/631,296, filed on Feb. 15, 2018.

(51) Int. Cl.
*G08B 13/16* (2006.01)
*G08B 17/00* (2006.01)
(Continued)

(52) U.S. Cl.
CPC ......... *G08B 13/1672* (2013.01); *G06F 16/61* (2019.01); *G06F 21/602* (2013.01);
(Continued)

(58) Field of Classification Search
CPC ............................ G08B 13/1672; G08B 17/00
(Continued)

(56) References Cited

U.S. PATENT DOCUMENTS 4,709,330 A    11/1987  Yokoi et al.
5,504,717 A *   4/1996  Sharkey ................. G01S 3/808
                                                     367/124
(Continued)

FOREIGN PATENT DOCUMENTS

CN    102 843 205 B    12/2012
EP      1 806 952 A2    7/2007
(Continued)

OTHER PUBLICATIONS

International Search Report and Written Opinion of the International Searching Authority, dated Jun. 18, 2019, from International Application No. PCT/IB2019/051202, filed on Feb. 14, 2019. 24 pages.

(Continued)

*Primary Examiner* — John A Tweel, Jr.
(74) *Attorney, Agent, or Firm* — HoustonHogle LLP

(57) ABSTRACT

A gunshot detection system continually monitors ambient noise throughout a building, learns the building's auditory patterns, and alerts users when sounds are found to be unusual or generally indicative of a dangerous situation. For example, gunshot sensor units positioned throughout the building include microphones. During a learning period (e.g. during normal conditions), these microphones capture ambient noise. The gunshot detection system generates ambient noise models representing the ambient noise during the (Continued)

normal conditions. The gunshot detection system then continually processes currently captured audio data depicting ambient noise (and potential acoustic anomalies) against the ambient noise models to detect and/or identify the acoustic anomalies and to determine whether to generate an alert.

29 Claims, 7 Drawing Sheets

(51) Int. Cl.
| | |
|---|---|
| G08B 17/06 | (2006.01) |
| G08B 25/10 | (2006.01) |
| G08B 25/14 | (2006.01) |
| H04L 41/06 | (2022.01) |
| G08B 29/18 | (2006.01) |
| G08B 29/24 | (2006.01) |
| G06F 16/61 | (2019.01) |
| H04W 12/037 | (2021.01) |
| G06F 21/60 | (2013.01) |
| G06Q 50/26 | (2012.01) |
| H04L 9/08 | (2006.01) |
| H04L 9/14 | (2006.01) |
| H04W 56/00 | (2009.01) |
| G08B 19/00 | (2006.01) |
| G08B 25/04 | (2006.01) |
| G07C 9/00 | (2020.01) |
| G08B 7/06 | (2006.01) |
| G08B 25/01 | (2006.01) |
| H04W 4/029 | (2018.01) |
| H04W 4/38 | (2018.01) |
| H04W 4/90 | (2018.01) |
| H04W 84/18 | (2009.01) |
| H04W 84/20 | (2009.01) |

(52) U.S. Cl.
CPC ....... *G06Q 50/265* (2013.01); *G07C 9/00182* (2013.01); *G08B 7/066* (2013.01); *G08B 17/00* (2013.01); *G08B 17/06* (2013.01); *G08B 19/00* (2013.01); *G08B 25/014* (2013.01); *G08B 25/04* (2013.01); *G08B 25/10* (2013.01); *G08B 25/14* (2013.01); *G08B 29/188* (2013.01); *G08B 29/24* (2013.01); *H04L 9/0894* (2013.01); *H04L 9/14* (2013.01); *H04L 41/06* (2013.01); *H04W 4/029* (2018.02); *H04W 4/38* (2018.02); *H04W 4/90* (2018.02); *H04W 12/037* (2021.01); *H04W 56/0015* (2013.01); *H04W 84/18* (2013.01); *H04W 84/20* (2013.01)

(58) Field of Classification Search
USPC ...................................................... 340/686.1
See application file for complete search history.

(56) References Cited

U.S. PATENT DOCUMENTS

| | | | |
|---|---|---|---|
| 5,973,998 A * | 10/1999 | Showen | G01S 5/0036 367/129 |
| 6,552,963 B2 | 4/2003 | Baranek et al. | |
| 6,970,183 B1 | 11/2005 | Monroe | |
| 7,228,429 B2 | 6/2007 | Monroe | |
| 7,411,865 B2 * | 8/2008 | Calhoun | G01S 7/003 367/124 |
| 7,460,006 B2 | 12/2008 | Kates | |
| 7,676,194 B2 | 3/2010 | Rappaport | |
| 7,843,356 B2 | 11/2010 | Webb | |
| 7,986,231 B1 | 7/2011 | Bentley et al. | |
| 8,149,649 B1 * | 4/2012 | Brinn | F41J 5/06 367/129 |
| 8,806,632 B2 | 8/2014 | Stefanidakis et al. | |
| 9,432,720 B2 | 8/2016 | Kruglick | |
| 9,642,131 B2 | 5/2017 | Bohlander et al. | |
| 9,672,700 B2 | 6/2017 | Lax | |
| 9,672,727 B1 | 6/2017 | Alexander et al. | |
| 9,679,459 B2 | 6/2017 | Crowe | |
| 9,830,932 B1 | 11/2017 | Gunderson et al. | |
| 9,888,371 B1 | 2/2018 | Jacob | |
| 10,089,845 B2 | 10/2018 | Skorpik et al. | |
| 10,102,732 B2 | 10/2018 | Gersten | |
| 10,586,109 B1 | 3/2020 | Fowler et al. | |
| 10,657,800 B1 | 5/2020 | Fowler et al. | |
| 10,741,058 B1 | 8/2020 | Miller | |
| 10,928,244 B2 * | 2/2021 | Warren | G01H 3/12 |
| 11,170,619 B2 | 11/2021 | Connell, II et al. | |
| 11,282,536 B2 * | 3/2022 | Davis | F41A 19/01 |
| 2006/0109113 A1 | 5/2006 | Reyes et al. | |
| 2008/0165621 A1 | 7/2008 | Fisher et al. | |
| 2009/0222241 A1 | 9/2009 | Dorogi et al. | |
| 2010/0271905 A1 * | 10/2010 | Khan | G10L 25/48 367/124 |
| 2010/0305778 A1 | 12/2010 | Dorneich et al. | |
| 2011/0169633 A1 | 7/2011 | Lauder et al. | |
| 2014/0218518 A1 | 8/2014 | Oliver | |
| 2014/0222943 A1 | 8/2014 | Oleson et al. | |
| 2014/0269199 A1 | 9/2014 | Weldon et al. | |
| 2014/0277609 A1 | 9/2014 | Nye et al. | |
| 2014/0327543 A1 | 11/2014 | Showen et al. | |
| 2014/0340222 A1 | 11/2014 | Thornton et al. | |
| 2015/0061869 A1 | 3/2015 | Crowe et al. | |
| 2015/0070166 A1 | 3/2015 | Boyden et al. | |
| 2015/0077550 A1 | 3/2015 | Apelbaum et al. | |
| 2015/0339913 A1 | 11/2015 | Lyman et al. | |
| 2015/0347079 A1 | 12/2015 | Price et al. | |
| 2016/0232774 A1 | 8/2016 | Noland et al. | |
| 2016/0260307 A1 | 9/2016 | Skorpik et al. | |
| 2016/0269397 A1 | 9/2016 | Camenisch et al. | |
| 2016/0379456 A1 | 12/2016 | Nongpiur et al. | |
| 2017/0045336 A1 | 2/2017 | Crowe et al. | |
| 2017/0069190 A1 | 3/2017 | Hansen et al. | |
| 2017/0103643 A1 | 4/2017 | Powers, III et al. | |
| 2017/0169686 A1 | 6/2017 | Skorpik et al. | |
| 2017/0289650 A1 | 10/2017 | Schattmaier et al. | |
| 2017/0301220 A1 | 10/2017 | Jarrell et al. | |
| 2018/0053394 A1 | 2/2018 | Gersten | |
| 2018/0122030 A1 | 5/2018 | Raz et al. | |
| 2018/0160278 A1 | 6/2018 | Patel et al. | |
| 2018/0199179 A1 | 7/2018 | Rauner | |
| 2019/0130723 A1 | 5/2019 | Thiel et al. | |
| 2019/0213901 A1 | 7/2019 | Kur et al. | |
| 2019/0347920 A1 * | 11/2019 | Anderson | G08B 13/1672 |
| 2021/0158837 A1 * | 5/2021 | Saki | G06N 3/0454 |
| 2021/0202067 A1 | 7/2021 | Williams et al. | |

FOREIGN PATENT DOCUMENTS

| | | |
|---|---|---|
| EP | 3032508 A1 | 6/2016 |
| JP | 2001236822 A | 8/2001 |
| JP | 4973380 B2 | 7/2012 |
| JP | 2017520831 | 7/2017 |
| WO | WO 9110980 | 7/1991 |
| WO | WO 2010039130 | 4/2010 |
| WO | WO 2010111556 | 9/2010 |
| WO | WO 2011134371 | 11/2011 |
| WO | WO 2012092562 | 7/2012 |
| WO | WO 2018044553 | 3/2018 |
| WO | WO 2018044556 | 3/2018 |
| WO | WO 2018185723 | 10/2018 |
| WO | WO 2019159098 | 8/2019 |
| WO | WO 2019159099 | 8/2019 |
| WO | WO 2019159100 | 8/2019 |
| WO | WO 2019159101 | 8/2019 |
| WO | WO 2019159102 | 8/2019 |
| WO | WO 2019159104 | 8/2019 |

(56) References Cited

FOREIGN PATENT DOCUMENTS

| WO | WO 2019159105 | 8/2019 |
|----|---------------|--------|
| WO | WO 2019159106 | 8/2019 |

OTHER PUBLICATIONS

International Search Report and Written Opinion of the International Searching Authority, dated May 21, 2019, from International Application No. PCT/IB2019/051203, filed on Feb. 14, 2019. 13 pages.
International Search Report and Written Opinion of the International Searching Authority, dated May 14, 2019, from International Application No. PCT/IB2019/051204, filed on Feb. 14, 2019. 15 pages.
International Search Report and Written Opinion of the International Searching Authority, dated Jul. 12, 2019, from International Application No. PCT/IB2019/051205, filed on Feb. 14, 2019. 23 pages.
International Search Report and Written Opinion of the International Searching Authority, dated Jun. 12, 2019, from International Application No. PCT/IB2019/051206, filed on Feb. 14, 2019. 13 pages.
International Search Report and Written Opinion of the International Searching Authority, dated Jun. 14, 2019, from International Application No. PCT/IB2019/051207, filed on Feb. 14, 2019. 13 pages.
International Search Report and Written Opinion of the International Searching Authority, dated May 31, 2019, from International Application No. PCT/IB2019/051208, filed on Feb. 14, 2019. 18 pages.
International Search Report and Written Opinion of the International Searching Authority, dated Jul. 23, 2019, from International Application No. PCT/IB2019/051209, filed on Feb. 14, 2019. 20 pages.
International Search Report and Written Opinion of the International Searching Authority, dated May 24, 2019, from International Application No. PCT/IB2019/051210, filed on Feb. 14, 2019. 15 pages.
Partial Search Report dated Apr. 24, 2019, from International Application No. PCT/IB2019/051202, filed on Feb. 14, 2019. 14 pages.
Partial Search Report dated May 17, 2019, from International Application No. PCT/IB2019/051205, filed on Feb. 14, 2019. 13 pages.
Partial Search Report dated May 31, 2019, from International Application No. PCT/IB2019/051209, filed on Feb. 14, 2019. 12 pages.
International Preliminary Report on Patentability dated Aug. 27, 2020 from International Application No. PCT/IB2019/051202, filed on Feb. 14, 2019. 14 pages.
International Preliminary Report on Patentability dated Aug. 27, 2020, from International Application No. PCT/IB2019/051203, filed on Feb. 14, 2019. 7 pages.
International Preliminary Report on Patentability dated Aug. 27, 2020, from International Application No. PCT/IB2019/051204, filed on Feb. 14, 2019. 9 pages.
International Preliminary Report on Patentability dated Aug. 27, 2020, from International Application No. PCT/IB2019/051205, filed on Feb. 14, 2019. 23 pages.
International Preliminary Report on Patentability dated Aug. 27, 2020, from International Application No. PCT/IB2019/051206, filed on Feb. 14, 2019. 8 pages.
International Preliminary Report on Patentability dated Aug. 27, 2020, from International Application No. PCT/IB2019/051207, filed on Feb. 14, 2019. 8 pages.
International Preliminary Report on Patentability dated Aug. 27, 2020, from International Application No. PCT/IB2019/051208, filed on Feb. 14, 2019. 12 pages.
International Preliminary Report on Patentability dated Aug. 27, 2020, from International Application No. PCT/IB2019/051209, filed on Feb. 14, 2019. 12 pages.
International Preliminary Report on Patentability dated Aug. 27, 2020, from International Application No. PCT/IB2019/051210, filed on Feb. 14, 2019. 9 pages.

* cited by examiner

GUNSHOT DETECTION SYSTEM WITH AMBIENT NOISE MODELING AND MONITORING

RELATED APPLICATIONS

This application is a § 371 National Phase Application of International Application No. PCT/IB2019/051207, filed on Feb. 14, 2019, which claims the benefit under 35 USC 119(e) of U.S. Provisional Application No. 62/631,296, filed on Feb. 15, 2018, and U.S. Provisional Application No. 62/637,161, filed on Mar. 1, 2018, all of which are incorporated herein by reference in their entirety.

This Application is Related to:

International Application number PCT/M2019/051202 filed Feb. 14, 2019, entitled "Gunshot detection system with forensic data retention, live audio monitoring, and two-way communication," now International Patent Publication No.: WO 2019/159098;

International Application number PCT/IB2019/051203 filed on Feb. 14, 2019, entitled "Gunshot detection system with master slave timing architecture," now International Patent Publication No.: WO 2019/159099;

International Application number PCT/IB2019/051204 filed on Feb. 14, 2019, entitled "Gunshot detection system with encrypted, wireless transmission," now International Patent Publication No.: WO 2019/159100;

International Application number PCT/IB2019/051205 filed on Feb. 14, 2019, entitled "Gunshot detection system with building management system integration," now International Patent Publication No.: WO 2019/159101;

International Application number PCT/IB2019/051206 filed on Feb. 14, 2019, entitled "Gunshot detection system anti-tampering protection," now International Patent Publication No.: WO 2019/159102;

International Application number PCT/IB2019/051208 filed on Feb. 14, 2019, entitled "Gunshot detection system with fire alarm system integration," now International Patent Publication No.: WO 2019/159104;

International Application number PCT/IB2019/051209 filed on Feb. 14, 2019, entitled "Gunshot detection sensors incorporated into building management devices," now International Patent Publication No.: WO 2019/159105; and International Application number PCT/IB2019/051210 filed on Feb. 14, 2019, entitled "Gunshot detection system with location tracking," now International Patent Publication No.: WO 2019/159106.

All of the afore-mentioned applications are incorporated herein by this reference in their entirety.

BACKGROUND OF THE INVENTION

Shooting incidents, involving active shooters shooting victims within buildings such as schools or malls, are increasingly a concern. Identifying and reacting quickly to such incidents can reduce loss of life. For example, first responders need to know if gunshots have actually been fired and the location and number of the fired shots.

In confined areas, such as in a school or a private or public building, detecting and locating the source of gunshots is a complicated problem. A gunshot typically generates several sounds including the gunshot itself, the bullet's bow shockwave, noise from bullet impacts and noise of reflected gunshot sounds. In addition, numerous noises are generated in buildings that may be mistakenly identified as gunshots.

The broad concept of detecting gunshots utilizing acoustics is known. More specifically, it is known to provide a gunshot detection system including an array of acoustic sensors positioned in a pattern which enables signals from the sensors to be employed to not only detect the firing of a gunshot but to also locate the origin of the shot. One main requirement of such a system is the need to accurately distinguish between the sound produced from a gunshot and a host of other ambient sounds. In at least one known arrangement, a microphone is used to detect each sound, which is then amplified, converted to an electrical signal and then the electrical signal is compared with a threshold value above which a gunshot sound is expected to exceed.

Recently, gunshot detection systems with improved accuracy, dependability, and effectiveness have been described. One such system is described in International Publication Number WO 2018/044553, published on Mar. 8, 2018 and entitled "System and Method for Acoustically Identifying Gunshots Fired Indoors." This system provides for low false alarms or false positives and high detection rates by employing two microelectromechanical microphones (MEMs) having different sensitivity levels. Acoustic signals from a first microphone with lower sensitivity (for example, making the anomaly detection microphone essentially deaf to routine sounds) are first analyzed for a peak amplitude level large enough to be a potential gunshot. Then acoustic signals from a second microphone having a higher sensitivity are then analyzed further to confirm that the sound was a gunshot.

Gunshot detection methods have also been proposed that can count the number of gunshots fired, particularly from an automatic or fast acting weapon. One such method is described in International Publication Number WO 2018/044556, published on Mar. 8, 2018 and entitled "Method for Acoustically Counting Gunshots Fired Indoors." In this method, an acoustic signature of captured noise is analyzed to accurately count how many shots are fired. The method can be employed to identify that the gun is an automatic or rapid fire weapon, which information can be provided to emergency personnel.

Additionally, gunshot detection system that can accurately determine where sensed events are located have been proposed. One such system is described in International Publication Number WO 2018/185723, published on Oct. 11, 2018 and entitled "System and Method for Identifying and Locating Sensed Events." Here, a sensor network is employed to detect an event in the form of an audible signal. The event is time stamped and sent to a controller, which evaluates the event as either unique or a multiple detection using the sensor's time of alarm to determine which sensor activated first and to suppress subsequent alarms for the same event. This process is known as de-confliction.

SUMMARY OF THE INVENTION

Features can be added to these gunshot detection systems to make them more useful in a wider range of contexts. For example, it would be desirable to extend acoustic recognition capabilities of these systems, for example, to include other sounds that might be indicative of dangerous situations.

The presently disclosed gunshot detection system continually or periodically monitors ambient noise throughout a building, possibly learning the building's acoustic patterns, and alerts users when sounds are found to be unusual or possibly indicative of a dangerous situation. Gunshot sensor units positioned throughout the building include microphones. During a learning period, these microphones capture ambient noise during normal conditions. The gunshot detection system generates ambient noise models representing the ambient noise during normal conditions. The gunshot detection system then processes currently captured audio data depicting, for example, potential acoustic anomalies against the ambient noise models to detect and/or identify the acoustic anomalies and to determine whether to generate an alert. In this way, the system can alert users such as an operator of a control panel to any unusual sounds occurring throughout the building. The operator might then investigate the unusual sounds to make sure there is no emergency.

For example, if sensors were deployed in hotel rooms it could monitor the usual sounds generated therein and generate the ambient noise model. If the system detected a loud thump or screech, it could notify the front desk to initiate an inquiry by, for example, sending someone to knock on the door of the room. In another example, if the system is expecting a certain level of ambient noise based on the ambient noise model but the amplitude is suddenly diminished, that could be a sign that someone has blocked the microphone and an inquiry is warranted.

Further enhancements to the gunshot detection system could also include not only detecting the acoustic anomalies but identifying them as well. For example, the system could use preconfigured danger indicators, which represent acoustic patterns indicative of different dangerous situations, for example, including acoustic patterns associated with breaking glass, human screams, unexpected crashing noises, or even obstruction of the microphones of the gunshot sensor units. By processing the current audio data against the danger indicators (e.g. by recognizing the acoustic patterns of the danger indicators in the current audio data), the system could identify the acoustic anomalies and include information about the recognized danger indicator in the alerts sent to the users of the system.

The gunshot detection system can further include privacy features for ensuring that communications between occupants of the building are not monitored using the gunshot detection system. For example, the ambient noise models could be configured to ensure that speech sounds are not detected as acoustic anomalies. In another example the current audio data generated depicting the ambient noise could be filtered to remove speech sounds matching certain criteria (e.g. at a normal expected volume). In another example, the gunshot detection system automatically deletes the current audio data upon confirmation that no acoustic anomalies were detected. In yet another layer of protection, the current audio data could even be deleted if detected acoustic anomalies are not then identified based on the preconfigured danger indicators.

In general, according to one aspect, the invention features a system for detecting gunshots. The system comprises gunshot sensor units, which detect the gunshots (e.g. via one or more microphones). These microphones also generate audio data depicting ambient noise. The system detects acoustic anomalies by processing current audio data against ambient noise models that represent ambient noise captured by the gunshot sensor units during normal conditions.

In embodiments, controllers of the gunshot sensor units could generate the ambient noise models and process the current audio data to detect the acoustic anomalies, or the gunshot sensor units could stream the current audio data to a control panel of the gunshot detection system, which would generate the ambient noise models and process the current audio data. In either case, the ambient noise models could then be stored in nonvolatile storage of the gunshot sensor units and the control panels respectively. The acoustic anomalies could be identified by processing the current audio data against danger indicators, which represent acoustic patterns indicative of dangerous situations such as gunshot sounds, screaming sounds, unusually loud sounds and/or unusually low amplitude sounds (e.g. indicating obstruction of the microphones of the gunshot sensor units). The current audio data could be automatically deleted in response to detecting no acoustic anomalies. On the other hand, when acoustic anomalies are detected, alerts could be generated based on the detected acoustic anomalies.

In general, according to another aspect, the invention features a method for detecting gunshots. Audio data depicting ambient noise is generated via microphones of gunshot sensor units. Ambient noise models for the gunshot sensor units are then generated, the ambient noise models representing ambient noise captured by the gunshot sensor units during normal conditions. Acoustic anomalies are detected by processing current audio data against the ambient noise models.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
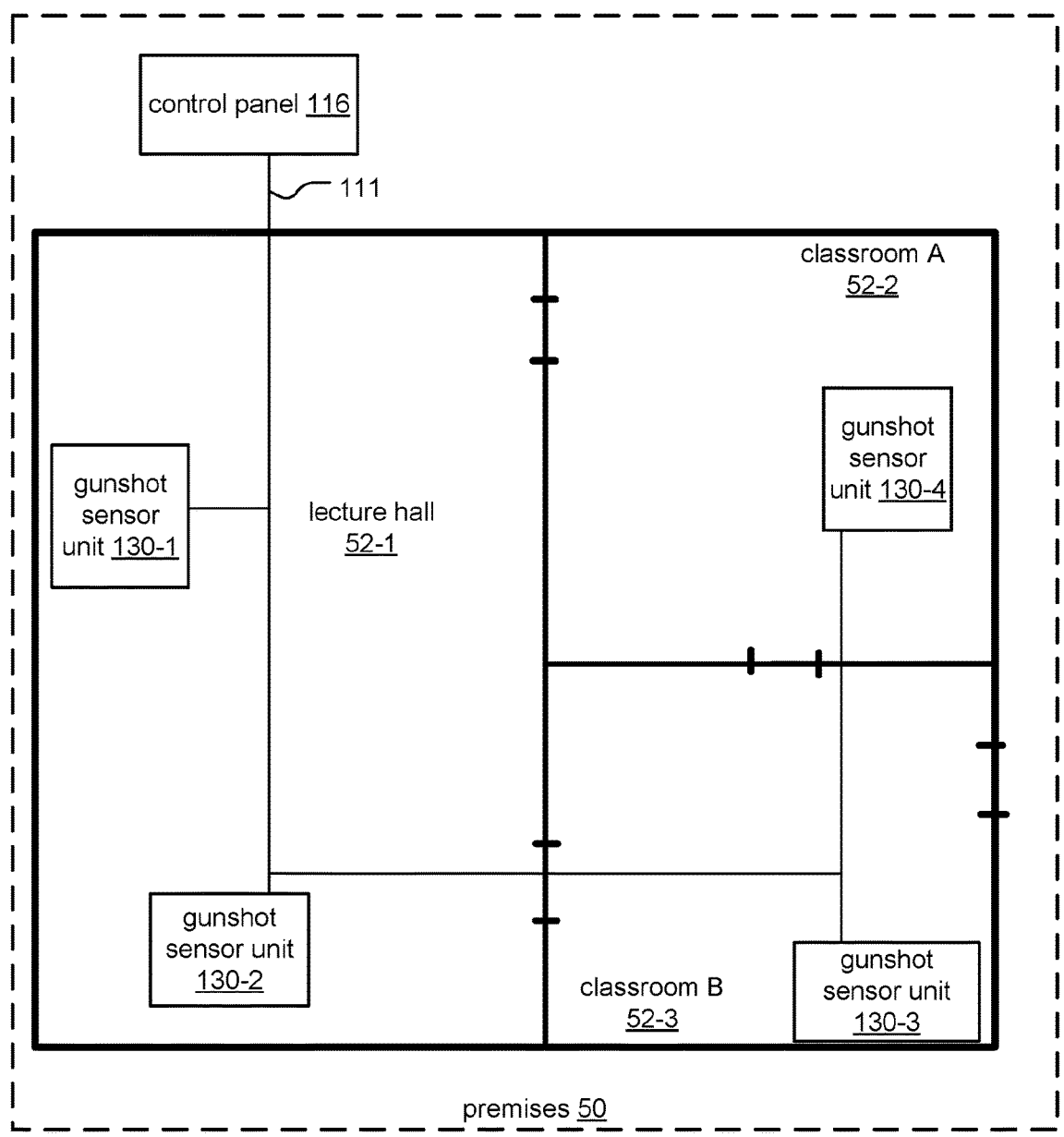
FIG. 1 is a schematic diagram of an exemplary gunshot detection system showing a common context for embodiments of the present invention.

FIG. 1 is a schematic diagram of an exemplary gunshot detection system 100.

In general, the gunshot detection system 100 monitors, detects and reports the occurrence of gunshots or other emergencies within a premises 50 such as a building (e.g. office, hospital, warehouse, retail establishment, shopping mall, school, multi-unit dwelling, government building).

In the illustrated example, the premises 50 is a simplified floor example of a building with three areas 52, a lecture hall 52-1, classroom A 52-2, and classroom B 52-3.

The gunshot detection system 100 includes gunshot sensor units 130 and a control panel 116, which communicate with each other over a communication network 111.

The gunshot sensor units 130 are distributed throughout the premises 50, for example, in areas 52 of the premises such as rooms, hallways, lobbies or stairways, to name a few examples. In the illustrated example, two gunshot sensor units 130-1, 130-2 are located in the lecture hall 52-1, while one gunshot sensor unit 130-2 is located in classroom A 52-2, and one gunshot sensor unit 130-3 is located in classroom B 52-3.

In general, according to a baseline gunshot detection functionality of the gunshot detection system 100, the gunshot sensor units 130 detect conditions indicative of the gunshots or other emergencies and alert the control panel 116, which takes one or more responsive actions such as alerting building personnel, law enforcement, and/or a monitoring center, or collecting and presenting data pertaining to the detected gunshots to an operator of the control panel 116.

More specifically, the gunshot sensor units 130 detect acoustic anomalies indicating potential gunshots and generate audio data depicting the acoustic anomalies. The gunshot sensor units 130 also generate event data based on and descriptive of the acoustic anomalies and locally store and/or send the event data to the control panel 116.

The event data often includes: audio data (e.g. digitized audio clips) depicting the acoustic anomalies and metadata. This metadata includes, for example, time information indicating when the acoustic anomalies started and/or stopped, duration information for the acoustic anomalies and/or the audio data depicting the acoustic anomalies, file information, and identification information for the gunshot sensor unit 130 that detected the anomaly; and other sensor data generated by the gunshot sensor unit.

The control panel 116 directs the overall functionality of the gunshot detection system 100 by sending instructions (e.g. control messages) to be executed by the gunshot sensor units 130, receiving the event data from the gunshot sensor units 130 and taking the responsive actions based on the event data. The control panel 116 might receive preliminary event data (e.g. metadata indicating time and date information) from multiple gunshot sensor units 130 and perform a de-confliction process in order to determine which event data from the different sensor units 130 pertains to the same detected acoustic anomaly and which of the gunshot sensor units 130 is closest to the source of the acoustic anomaly based on, for example, which of the units first detected the acoustic anomaly. The control panel 116 might then send instructions to the gunshot sensor unit 130 closest to the source to send full event data (e.g. including a full audio data sample, environmental data, and other sensor data) to the control panel 116 for further processing and/or to be presented to the operator.

In addition, according to an enhanced anomaly detection and identification functionality of the gunshot detection system 100, the gunshot sensor units 130 capture ambient noise (e.g. sounds, in aggregate, emitted by people, objects, animals, devices, natural/environmental forces and, in general, any other source of sounds that are within range of the gunshot sensor units 130) and generate audio data depicting the captured ambient noise. In general, the gunshot detection system 100 continually monitors the captured ambient noise throughout premises 50, learns the premises' 50 auditory patterns (e.g. during a learning mode), and alerts users when sounds are found to be unusual or generally indicative of a dangerous situation.

Figure 2:
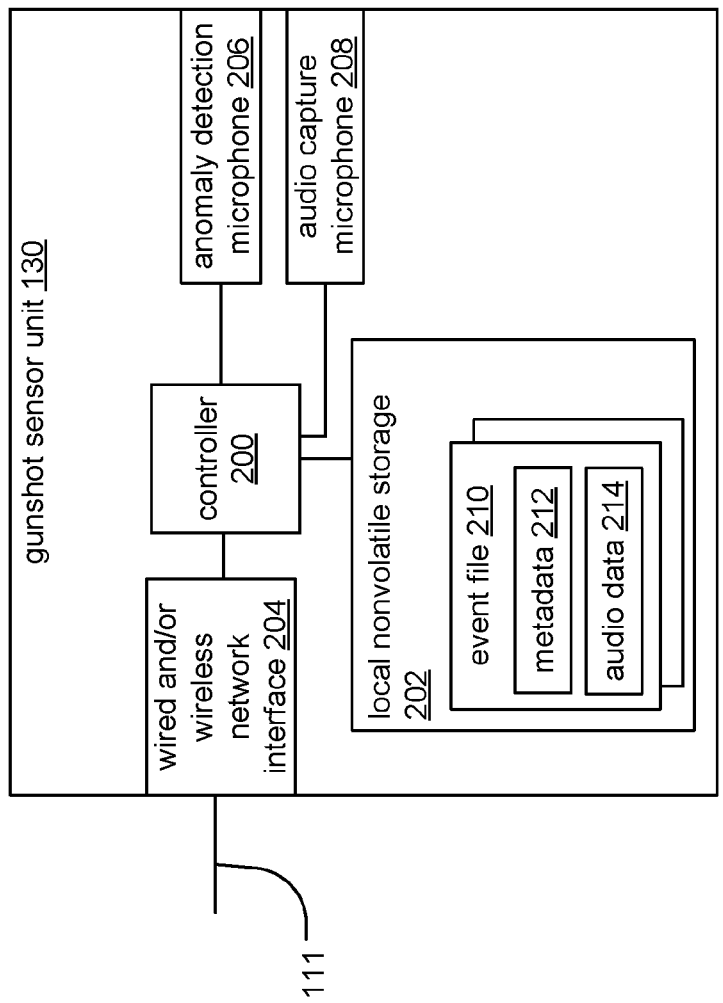
FIG. 2 is a block diagram showing an exemplary gunshot sensor unit of the gunshot detection system according to one embodiment.

FIG. 2 is a block diagram showing an exemplary gunshot sensor unit 130.

The gunshot sensor unit 130 includes a controller 200, local nonvolatile storage 202, a wired and/or wireless network interface 204, an anomaly detection microphone 206, and an audio capture microphone 208.

The wired and/or wireless network interface 204 provides connectivity with the gunshot detection system control panel 116 and possibly other devices via the gunshot detection communication network 111. In addition, the network also provides power to the devices, in many examples. Direct current (DC) is superimposed upon the data that is transmitted between the devices and other nodes on the network.

In general, the controller 200 executes firmware/operating system instructions and generally directs the functionality of the gunshot sensor unit 130. In one example, the controller 200 is small single-board computer. In other examples, the controller is a microcontroller unit or a system on a chip (SoC), including one or more processor cores along with memory and programmable input/output peripherals such as analog to digital converts and digital to analog converters.

According to the baseline gunshot detection functionality of the gunshot detection system 100, the anomaly detection microphone 206 detects certain acoustic anomalies, and the audio capture microphone 208 captures the acoustic anomalies and generates the audio data depicting the acoustic anomalies. In one embodiment, both microphones 206, 208 are micro electro-mechanical system (MEMS) microphones having different sensitivity levels, and the controller 200 is configured to sample the microphones 206, 208 such that outputs from the microphones can be continuously analyzed in near real time for an acoustic signature. The anomaly detection microphone 206 has the lower sensitivity level and a high clipping level, while the audio capture microphone 208 has the higher sensitivity level. The audio capture microphone 208 continuously captures ambient sound, which is stored in a 9.9 second (for example) loop in a ring buffer of the controller 200. At the same time, incoming acoustic signals from the anomaly detection microphone 206 are continuously analyzed to detect acoustic anomalies, particularly by searching the incoming acoustic signal for a peak amplitude level large enough to be at least preliminarily identified as a gunshot.

Once an indication of a possible gunshot has been triggered utilizing the anomaly detection microphone 206, further processing may be performed by the controller 200. The controller 200 analyzes the sound stored in the loop to confirm that the acoustic anomaly is a gunshot. If confirmed as gunshot, the controller stores the captured sound stored in the loop buffer, which would include the acoustic anomaly and the previously captured sound (up to 9.9 seconds, in this example) as audio data 214 in the local nonvolatile storage 202 associated with different event files 210 or instances of event data for different gunshot detection events, along with the metadata 212, which includes the time and/or date information for the events. In embodiments, the local nonvolatile storage 202 could be fixed storage such as flash memory, or removable storage such as an SD card, among other examples.

According to the enhanced anomaly detection/identification functionality of the gunshot detection system 100, the audio capture microphone 208 also captures ambient noise and generates audio data depicting the ambient noise. The ambient noise might be captured during normal conditions (e.g. during the learning mode, during times when it is known that no dangerous situations are present, during times when the areas 52 where the gunshot sensor units 130 are located are being used in typical ways by occupants of the premises 50). The ambient noise might also be captured on a continual basis in order to detect and/or identify acoustic anomalies within the ambient noise. For this purpose, the gunshot sensor units 130 might generate current audio data depicting the captured ambient noise in real time, possibly including acoustic anomalies. The current audio data might be an ongoing series of audio clips of different predetermined lengths and might be processed (e.g. by the controller 200) to recognize and remove speech sounds to provide privacy to the occupants of the premises 50.

In the illustrated embodiment, the controller 200 is configured to stream audio data to the control panel 116 in response to instructions from the control panel 116, for example, upon initiation of the learning mode or upon detection of an acoustic anomaly by the anomaly detection microphone 206. The controller 200 is also configured to preserve or delete stored, current and/or buffered audio data in response to instructions from the control panel 116.

Figure 3:
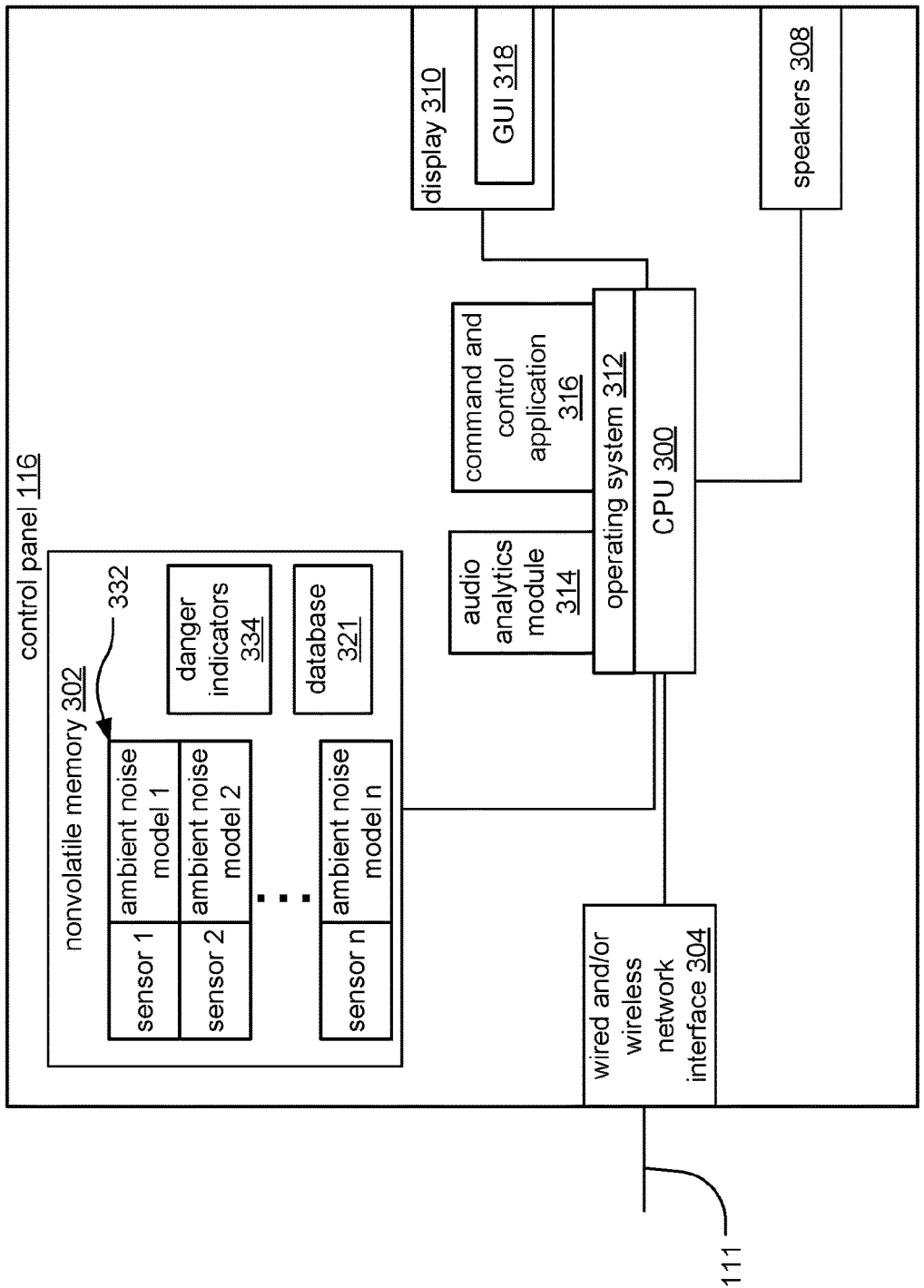
FIG. 3 is a block diagram showing an exemplary control panel of the gunshot detection system according to one embodiment.

FIG. 3 is a block diagram showing an exemplary control panel 116.

The control panel 116 includes a central processing unit (CPU) 300, nonvolatile memory 302, a wired and/or wireless network interface 304, a display 310, and speakers 308.

Similar to analogous components on the gunshot sensor units 130, the wired and/or wireless network interface 304 provides connectivity with the gunshot sensor units 130 and possibly other devices via the communication network 111. In some examples, the control panel may also supply power to the units.

The speakers 308 provide audio playback of audio data from the gunshot sensor units 130.

The CPU 300 executes firmware instructions and an operating system (OS) 312 and generally directs the functionality of the control panel 116. The OS 312 interfaces with the hardware components of the control panel 116 for access by a command and control application 316, which is a software process executing on top of the OS 312.

The command and control application 316, in general, controls the gunshot sensor units 130, maintains the gunshot event database 321, and provides a graphical user interface (GUI) 318 that is rendered on the display 310 (e.g. touchscreen display) of the control panel 116. In one example, the GUI 318 might present gunshot sensor unit information to an operator of the control panel 116 and receive input indicating selections of various options for controlling the gunshot sensor units 130 such as presenting the audio data (e.g. via the speakers 308), specifying various configuration settings and/or preserving or deleting locally stored audio data.

In the illustrated embodiment, the control panel 116 receives the streamed audio data from the gunshot sensor units 130 and processes the audio data to detect and/or identify the acoustic anomalies.

Thus, an audio analytics module 314 also executes on the CPU 300. In general, the audio analytics module 314 might be part of the command and control application 316 or perform operations in conjunction and/or communication with the command and control application 316.

The audio analytics module 314 generates ambient noise models 332 based on audio data generated by the gunshot sensor units 130 depicting the ambient noise captured by the audio capture microphones 208 of the units during normal conditions. These ambient noise models 332 could be generated and defined, as described, during a finite period wherein the system is placed in a learning mode. On the other hand, the ambient noise models 332 might also be initially generated and then continuously updated during normal operation of the gunshot detection system 100 after the initial learning mode period or even without a learning mode period entirely.

The ambient noise models 332, in general, are representations of the ambient noise captured by the audio capture microphones 208 of the gunshot sensor units 130 during the normal conditions. Each gunshot sensor unit 130 preferably has its own ambient noise model 332 representing the typical ambient noise at the particular gunshot sensor unit's 130 location. The ambient noise models 332 are further preferably generated based on variable factors such as current time of day, day of week, time of year, semester, month and/or season when the ambient noise was captured, known schedule information for the premises 50 and/or areas 52 of the premises indicating times when the ambient noise would be known to include more or less sounds, among other examples. The gunshot sensor units 130 could have multiple ambient noise models 332 pertaining to the different variable factors. During the generation process, the ambient noise models 332 could be configured to ensure that normal speech sounds are not detected as acoustic anomalies, for example, by including additional layers representing the normal speech sounds independent of whether these normal speech sounds were captured in the ambient noise. The ambient noise models 332 might include or be generated based on one or more condensed digital summaries (e.g. acoustic fingerprints) of the captured ambient noise, spectrograms for an audio signal for the ambient noise (e.g. generated via a spectrum analyzer), quantitative representations of properties of isolated sounds and/or the ambient noise in aggregate, including frequency, duration, loudness, timbre, sonic texture (e.g. number of different sources of sound and the interaction between them), and/or spatial location, among other examples.

The audio analytics module 314 receives the current audio data (e.g. captured in real time by the audio capture microphones 208 of the gunshot sensor units 130) and detects acoustic anomalies based on the current audio data by processing the current audio data against the ambient noise models 332 for the gunshot sensor units 130. In general, the processing to detect the acoustic anomalies might include generating a current model representing the current ambient noise based on the current audio data using the same process for generating the ambient noise models 332. The audio analytics module 314 would then compare the current model with the ambient noise model 332 in order to generate a deviation value representing a difference between the ambient noise during the normal conditions and the current ambient noise. In this example, acoustic anomalies could be detected based on whether the deviation value is above a predetermined threshold.

Additionally, the audio analytics module 314 identifies the acoustic anomalies (e.g. infers a source of the acoustic anomaly and/or classifies the acoustic anomaly as possibly associated with one or more known dangerous situations) by processing the current audio data against danger indicators 334.

The danger indicators 334 are preconfigured representations of acoustic patterns associated with and/or indicative of dangerous situations. Each danger indicator might include identification information for the situation (e.g. a unique identifier that can be interpreted by the gunshot detection system 100), descriptive text for the situation (e.g. a text string that can be interpreted by the users, which is included in the event data and/or alert messages sent to the users), and acoustic information for one or more acoustic patterns associated with the dangerous situation. For example, the acoustic patterns for the different danger indicators might be acoustic signatures of target sounds such as those associated with gunshots, screaming, breaking glass, or any unusually loud sounds, and/or unusually low amplitude sounds (e.g. indicating obstruction of the microphones 206, 208 of the gunshot sensor units 130).

In general, the audio analytics module 314 identifies the acoustic anomalies by recognizing acoustic patterns indicative of danger within the current ambient noise depicted by the current audio data. This might include isolating audio signals for discrete sounds (e.g. the acoustic anomalies) within the current ambient noise and determining whether properties of the isolated sounds match the acoustic signatures for one or more of the danger indicators. In one example, the acoustic information of the danger indicators would include danger models generated using the same processes for generating the ambient noise models 332 and the current noise models (e.g. based on a representative set of sample audio clips depicting the sounds indicative of the dangerous situations), and these danger models would be compared to similar models for the isolated sounds. In another example, the acoustic information could be different combinations of criteria for isolating within the current ambient noise the acoustic patterns associated with the danger indicators 334.

In one embodiment, the audio analytics module 314 might employ machine learning mechanisms and/or a neural network architecture. Generally, neural networks include processes organized into virtual nodes with interconnected inputs and outputs loosely based on neurons of the human brain. Numerical data corresponding to real-world phenomena propagate through the nodes based on different properties (e.g. functions performed by the nodes, variously weighted connections between nodes), producing an output which may or may not represent a meaningful result. The output might be evaluated against a target outcome and/or other information known to the networks, and the properties of the nodes and connections increasingly adjusted to make targeted and/or meaningful outcomes increasingly frequent. In this way, neural networks learn to process complex data sets and are used, for example, to recognize patterns and/or objects based on similarities and even classify objects based on known (e.g. labeled) data sets.

The audio analytics module 314 could include a neural network configured to detect and classify acoustic anomalies in the current audio data captured by the gunshot sensor units 130 based on recognized acoustic patterns in the audio data and a relationship between the patterns and reference data labeled to indicate a context for the data such as normal conditions and/or dangerous situations. For example, during a learning process, the audio analytics module 314 is provided with the labeled audio data and breaks the data into frames. An acoustic fingerprint could then be generated for each frame, the fingerprint including information such as energy levels for different frequency bands. Fourier transform methods could be used to further divide the frames into discrete sound waves with further values representing the energy of the sound waves. This numerical data is then analyzed by the audio analytics module 314, and meaningful associations are determined between, for example, recognized patterns in the audio data and whatever information is already known to the audio analytics module 314. Given an audio data sample of sufficient length depicting the ambient noise for a gunshot sensor unit 130 during normal conditions, the audio analytics module 314 might recognize patterns associated with discrete sound events and generate an ambient noise model 332 indicating acoustic properties of the sound events that occurred most frequently (or with a frequency above a predetermined threshold). In subsequently processed data (e.g. current audio data captured to monitor for anomalies), recognized sound events conforming to the ambient noise model 332 could be ignored, while those that deviate from the ambient noise model 332 might be flagged as detected acoustic anomalies. In another example, given a sufficiently large set of discrete audio samples depicting examples of sound events of known types (e.g. different examples of screams, explosions or gunshots), the audio analytics module 314 might recognize acoustic patterns in the audio data and build a learned association between the recognized acoustic patterns and the type of sounds based on which patterns occurred most frequently across the set of samples for each type. Subsequently processed audio data with recognized acoustic patterns matching those frequently recognized in the sample data could be classified based on the matching type and meaningful information about the nature of the detected acoustic anomaly can be provided, for example to the operator 107 of the control panel 116. The ambient noise models 332 for each of the gunshot sensor units 130 and the danger indicators 334 are stored in the nonvolatile memory 302 along with a gunshot event database 321.

The gunshot event database 321 stores information about the gunshot detection system 100. This information includes information about the devices of the gunshot detection system 100 including identification information and location information for each of the gunshot sensor units 130. The gunshot event database 321 also stores event data, audio data, any generated audio, event and/or environmental data analytics information, such as forensic data generated as a result of processing the data received from the gunshot sensor units 130, or order information indicating the order in which the gunshot sensor units 130 detected the gunshots. In the illustrated example, the gunshot event database 321 is stored in the nonvolatile memory 302 of the control panel 116. However, in other examples, the gunshot event database 321 might be part of a cloud management system and/or connected services system, which is accessible only over public networks, or even on the local nonvolatile storage 202 of the gunshot sensor units 130 themselves. In general, the audio analytics module.

Based on the acoustic anomalies detected and/or identified by the audio analytics module 314, the command and control application 316 generates alerts notifying users of the acoustic anomalies. These alerts might include information about the location of the acoustic anomalies based on information retrieved from the database 321 and/or the descriptive text for one or more matching danger indicators 334 identifying the acoustic anomalies.

Figure 4:
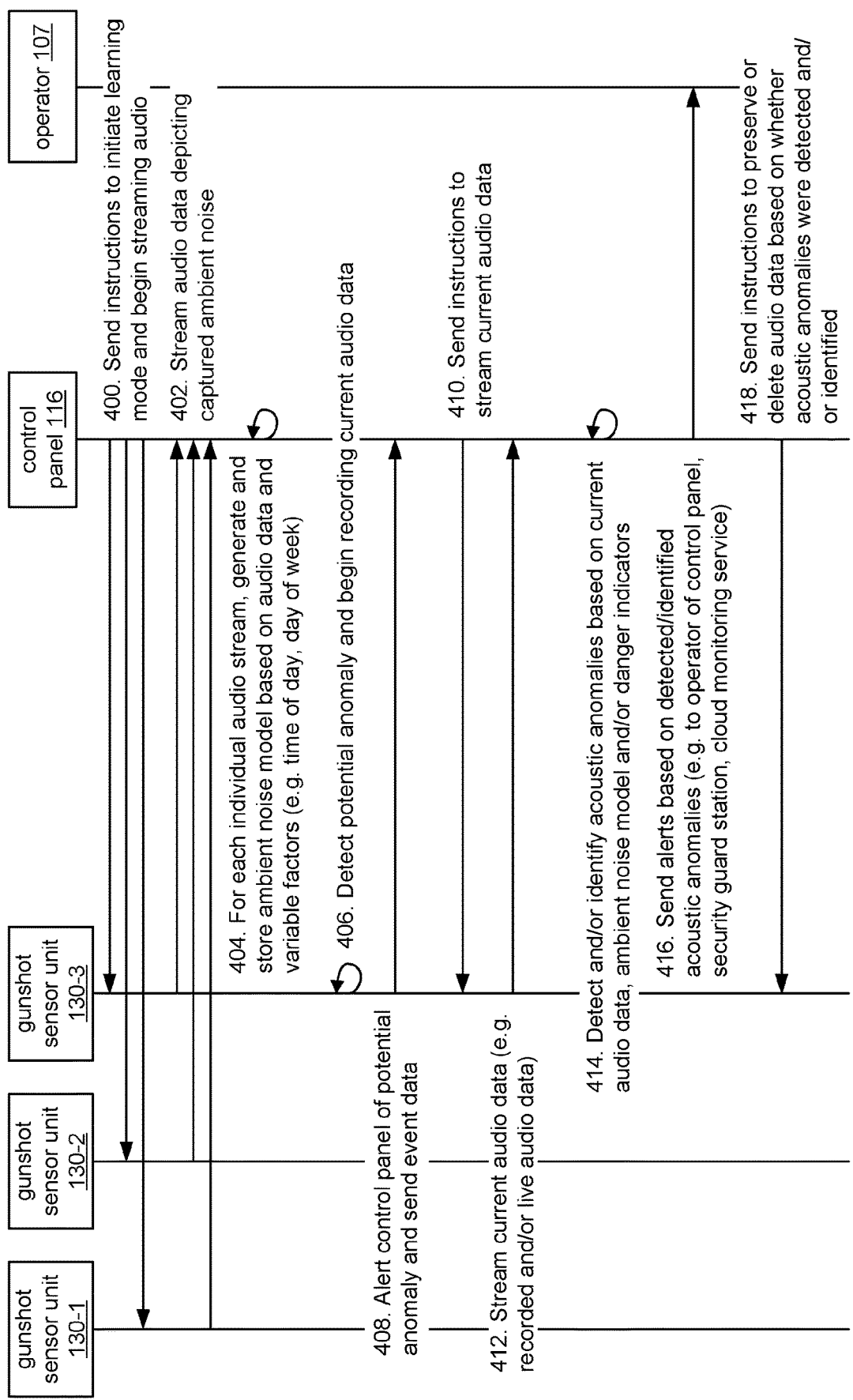
FIG. 4 is a sequence diagram illustrating a process by which the control panel generates ambient noise models for the gunshot sensor units, detects and identifies acoustic anomalies depicted by audio data streamed from the gunshot sensor units, and generates alerts based on the acoustic anomalies.

FIG. 4 is a sequence diagram illustrating a process by which the control panel 116 generates the ambient noise models 332, detects and identifies acoustic anomalies, and generates alerts, based on audio data streamed from the gunshot sensor units 130.

First, in step 400, the control panel 116 sends instructions to the gunshot sensor units 130 to initiate the learning mode in which the gunshot detection system 100 learns the auditory patterns of the premises 50. These instructions might also indicate that the gunshot sensor units 130 should stream captured audio data to the control panel 116.

In step 402, the gunshot sensor units capture the ambient noise during the normal conditions of the premises 50, generate audio data depicting the ambient noise, and stream the audio data to the control panel 116.

In step 404, the control panel 116 generates the ambient noise model 332 for each gunshot sensor unit 130 based on the streamed audio data from the gunshot sensor units 130 and based on other variable factors such as current time of day, day of week, time of year, semester, month and/or season when the ambient noise was captured, known schedule information for the premises 50 and/or areas 52 of the premises 50 stored in the database 321 indicating times when the ambient noise would be known to include more or less sounds, among other examples. The ambient noise models 332 are stored in the nonvolatile memory 302, for example, associated with identification information for each of the gunshot sensor units 130.

In step 406, the gunshot sensor unit 130-3 detects a potential acoustic anomaly (e.g. via the anomaly detection microphone 206) and begins recording audio data depicting the acoustic anomaly. The gunshot sensor units 130-3 also alerts the control panel 116 of the potential anomaly and sends event data generated based on the potential anomaly to the control panel 116 in step 408.

In step 410, the control panel 116 sends instructions to the gunshot sensor unit 130-3 to stream the recorded audio data depicting the acoustic anomaly and current audio data depicting ambient noise captured in real time. The gunshot sensor unit 130-4 streams the audio data to the control panel 116 in step 412.

In one example, the control panel 116 is a hybrid fire alarm system control panel and gunshot detection system control panel and might also instruct and receive streaming audio data from fire notification devices equipped with microphones for self-testing purposes. During normal operation, these microphones of the fire notification devices might be used to capture audio data depicting the sounds emitted by the fire notification devices in order to test that they are properly functioning. However, the hybrid control panel, or even the gunshot detection control panel 116 with connectivity with a fire alarm control panel, might send instructions to the fire notification devices to capture ambient noise and stream audio data depicting ambient noise to the control panel 116. The control panel 116 would generate an ambient noise model for the fire notification device. Against this ambient noise model, the control panel 116 would analyze ambient noise captured by the fire notification devices for acoustic anomalies.

In step 414, the control panel 116, via the audio analytics module 314, detects and/or identifies acoustic anomalies depicted in the streamed audio data based on the ambient noise model 332 for the gunshot sensor unit 130-3 and based on the danger indicators 334. Based on the detected/identified acoustic anomalies, in step 416, the control panel 116 generates and sends alerts to users such as an operator 107 of the control panel 116, a security guard station, or a cloud monitoring service, among other examples. The alerts might simply be presented to the operator via the GUI 318, or they could be messages sent to the users via email, text, and/or push notifications, among other examples.

In step 418, the control panel 116 also sends instructions to the gunshot sensor unit 130-3 to preserve or delete the recorded audio data based on whether any acoustic anomalies were detected and/or identified in the streamed audio data (e.g. based on the results of step 414).

Figure 5:
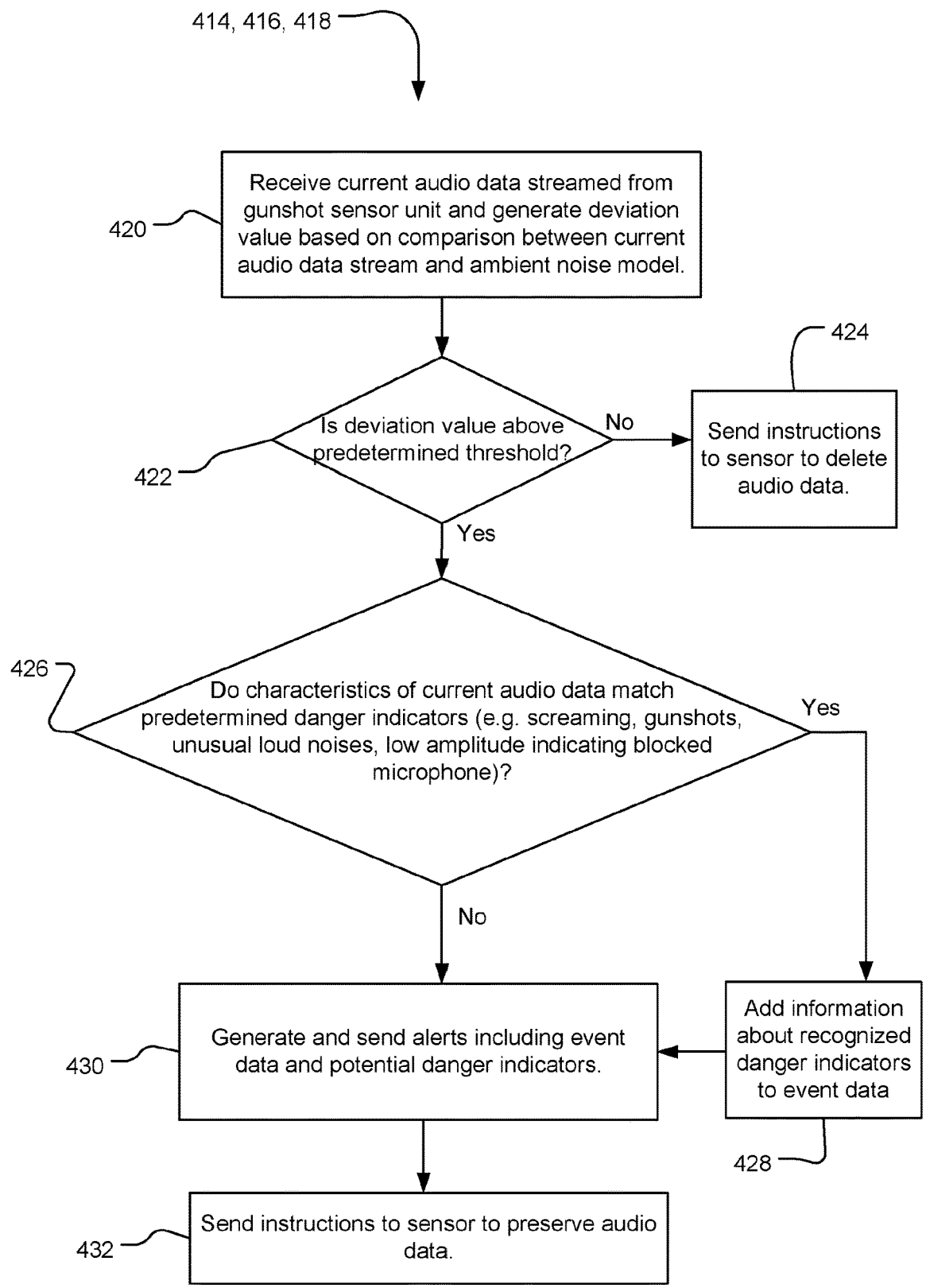
FIG. 5 is a flow diagram illustrating a process by which the control panel detects and identifies acoustic anomalies based on ambient noise models for the gunshot sensor units and preconfigured danger indicators.

FIG. 5 is a flow diagram illustrating the process by which the control panel 116 detects and/or identifies acoustic anomalies in audio data streamed from the gunshot sensor units 130 based on the ambient noise model 332 for the gunshot sensor unit 130 and based on the danger indicators 334. This process generally corresponds to the steps 414 through 418, which were previously described with respect to FIG. 4. Now, however, more detail is provided.

First, in step 420, the audio analytics module 314 executing on the control panel 116 receives the current audio data streamed from the gunshot sensor unit 130 and generates a deviation value based on a comparison between the current audio data stream and ambient noise model 332 for the gunshot sensor unit 130. The deviation value represents the difference between the ambient noise during the normal conditions, as represented by the ambient noise model 332, and the currently captured ambient noise, as represented by the current audio data and/or any models generated based on the current audio data.

In step 422, the audio analytics module 314 determines whether the deviation value is above a predetermined threshold. If not, in step 424, the control panel 116 sends instructions to the gunshot sensor unit 130 to delete the current audio data and/or to stop recording the audio data in real time.

However, if the deviation value is above the predetermined threshold, in step 426, the audio analytics module 314 determines whether characteristics of the current audio data match the acoustic patterns of any of the preconfigured danger indicators 334 such as those representing screaming, gunshots, unusual loud noises, or unusually low amplitude indicating obstruction of the microphones 206, 208, among other examples. If so, in step 428, information about the matching danger indicators are added to the event data (which, for example, could be stored in the database 321 and/or provided with alert messages). In one example, this added information might include the descriptive text for the danger indicators 334 such as "broken glass" or "screams".

Whether or not any matching danger indicators 334 were found in the current audio data, in step 430, the control panel 116 generates and sends the alerts to users such as the operator 107. The alerts might include the event data and information about the recognized danger indicators, as previously described.

In step 432, the control panel 116 also sends instructions to the gunshot sensor unit 130 to preserve the recorded audio data associated with the acoustic anomaly, for example, by storing the audio data in the local nonvolatile storage 202 and/or sending the audio data to be stored by the control panel 116.

Figure 6:
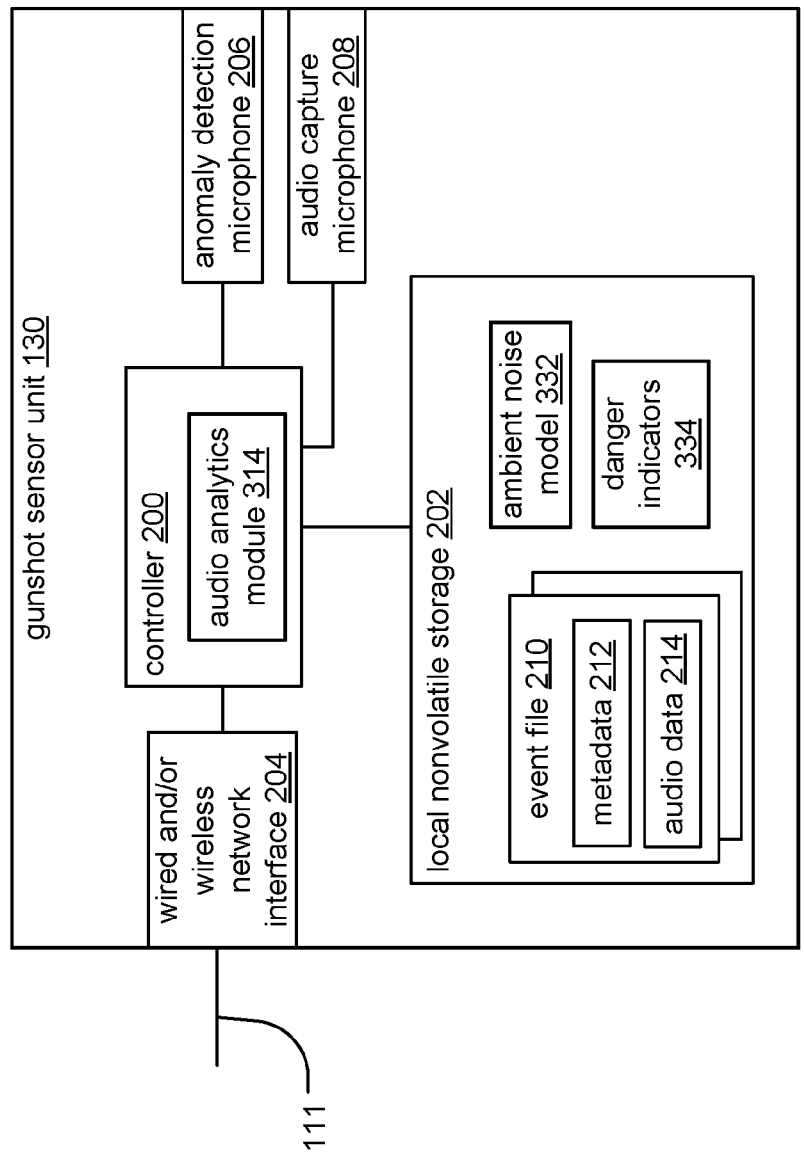
FIG. 6 is a block diagram of an exemplary gunshot sensor unit according to another embodiment.

FIG. 6 is a block diagram of an exemplary gunshot sensor unit 130 according to an embodiment in which the gunshot sensor units 130 generate their own ambient noise models 332 and autonomously detect and identify the acoustic anomalies based on the ambient noise models 332. The gunshot sensor unit 130 is largely the same as the unit illustrated in and described with respect to FIG. 2. Now, however, the audio analytics module 314 executes on the controller 200 of the gunshot sensor unit 130. Additionally, the ambient noise model 332 and the danger indicators 334 are stored in the local nonvolatile memory 202.

Figure 7:
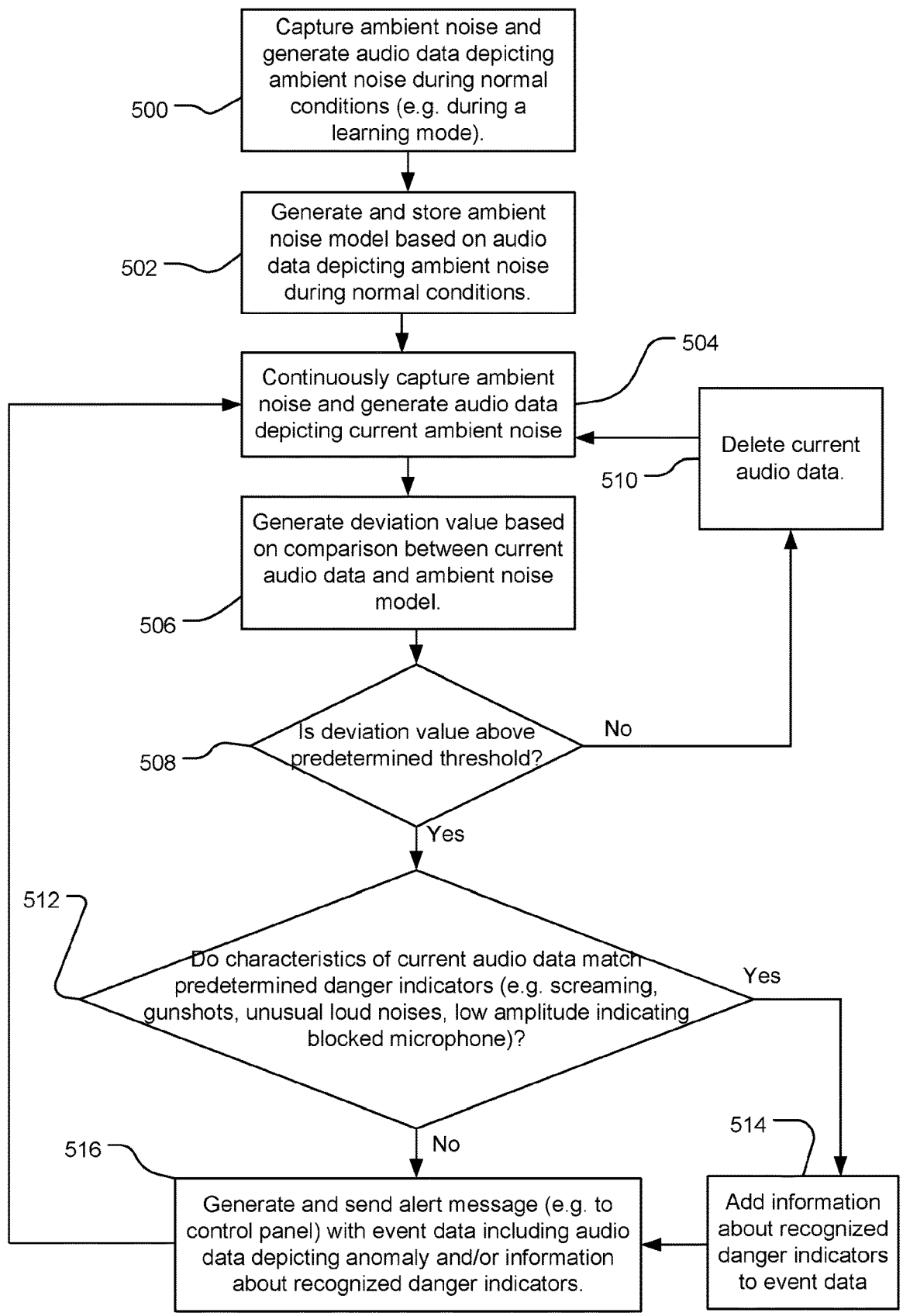
FIG. 7 is a flow diagram illustrating a process by which the gunshot sensor units generate the ambient noise models and autonomously detect and identify the acoustic anomalies.

FIG. 7 is a flow diagram illustrating a process by which the gunshot sensor units 130 generate the ambient noise models 332 and detect and/or identify acoustic anomalies based on the ambient noise model 332 and the danger indicators 334.

First, in step 500, the captures via the audio capture microphone 208 ambient noise during normal conditions (e.g. during the learning mode) and generates audio data depicting the ambient noise during normal conditions.

In step 502, the audio analytics module 314 executing on the gunshot sensor unit 130 generates the ambient noise model 332 based on the audio data depicting the ambient noise during normal conditions and stores the ambient noise model 332 for the gunshot sensor unit 130 in local nonvolatile storage 202.

In step 504, on a continuous basis, the gunshot sensor unit 130 captures ambient noise via the audio capture microphone 208 and generates current audio data depicting the ambient noise captured in real time.

In step 506, the audio analytics module 314 generates the deviation value based on a comparison of the current audio data and the ambient noise model 332 for the gunshot sensor unit 130. As previously described, the deviation value represents differences between the current ambient noise and the ambient noise captured during normal conditions.

In step 508, the audio analytics module 314 determines whether the deviation value is above the predetermined threshold. If not, in step 510, the gunshot sensor unit 130 deletes the current audio data and returns to step 504, as the process of monitoring the ambient noise repeats indefinitely.

However, if the deviation value was above the predetermined threshold, in step 512, the audio analytics module 314 determines whether the characteristics of the current ambient noise depicted in the current audio data match the acoustic patterns of any of the predetermined danger indicators 334. If so, in step 514, the gunshot sensor unit 130 adds the information about the matching danger indicators (e.g. the descriptive text) to the event data, which might be stored in the local nonvolatile storage 202 and/or send to the control panel 116.

In either case, in step 516, the gunshot sensor unit 130 generates and sends an alert message indicating that an acoustic anomaly was detected/identified. The alert message might include the audio data depicting the acoustic anomaly and/or the information for the matching danger indicators 334 that might have been added to the event data in step 514. The alert message might be sent to the control panel 116 to be further processed by the control panel 116 (including sending alerts on to the users), or the alert could be sent directly to the users.

The process then returns to step 504, as the ambient noise is continuously monitored by the gunshot sensor unit 130.

Additionally, it should be noted that the gunshot detection system 100 could be configured to perform the previously described processes for the baseline gunshot detection (e.g using the anomaly detection microphone 206) and the enhanced anomaly detection/identification (e.g. using the ambient noise models 332 and the audio analytics module 314) in a number of different ways. For example, the enhanced functionality might be used to expand the system's detection capability by detecting and identifying anomalies that were not detected via the baseline gunshot detection functionality. The gunshot detection system 100 could also be configured to perform both the enhanced and the baseline detection processes in parallel. In another example, the ambient noise models could be used to confirm and/or identify potential acoustic anomalies that were initially detected via the baseline gunshot detection functionality. In yet another example, the gunshot detection system 100 could be configured to perform only the enhanced detection process using the ambient noise models 332.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for detecting gunshots, the system comprising:
   gunshot sensor units for detecting gunshots, each of the gunshot sensor units comprising one or more microphones for generating audio data depicting ambient noise; and
   ambient noise models for the gunshot sensor units that represent ambient noise previously captured by the gunshot sensor units during normal conditions, wherein acoustic anomalies are detected by processing current audio data against the ambient noise models.

2. The system as claimed in claim 1, further comprising controllers of the gunshot sensor units that generate the ambient noise models and process the current audio data against the ambient noise models to detect the acoustic anomalies.

3. The system as claimed in claim 2, wherein the gunshot sensor units comprise local nonvolatile storage for storing the ambient noise models.

4. The system as claimed in claim 1, further comprising a control panel that generates the ambient noise models and processes the current audio data against the ambient noise models to detect the acoustic anomalies.

5. The system as claimed in claim 4, wherein the control panel comprises nonvolatile memory for storing the ambient noise models for each of the gunshot sensor units.

6. The system as claimed in claim 4, wherein the gunshot sensor units stream the current audio data to the control panel.

7. The system as claimed in claim 1, wherein the acoustic anomalies are identified by processing the current audio data against danger indicators, wherein the danger indicators represent acoustic patterns indicative of dangerous situations.

8. The system as claimed in claim 7, wherein the danger indicators are associated with gunshot sounds, screaming sounds, unusually loud sounds, and/or unusually low amplitude sounds indicating obstruction of the one or more microphones of the gunshot sensor units.

9. The system as claimed in claim 1, wherein the current audio data is deleted in response to detecting no acoustic anomalies.

10. The system as claimed in claim 1, wherein alerts are generated based on the detected acoustic anomalies.

11. A method for detecting gunshots, the method comprising:
generating audio data depicting ambient noise via microphones of gunshot sensor units;
generating ambient noise models for the gunshot sensor units, the ambient noise models representing ambient noise captured by the gunshot sensor units during normal conditions;
detecting acoustic anomalies by processing current audio data against the ambient noise models.

12. The method as claimed in claim 11, further comprising the gunshot sensor units generating the ambient noise models and processing the current audio data against the ambient noise models to detect the acoustic anomalies.

13. The method as claimed in claim 12, further comprising the gunshot sensor units storing the ambient noise models in local nonvolatile storage of the gunshot sensor units.

14. The method as claimed in claim 11, further comprising a control panel generating the ambient noise models and processing the current audio data against the ambient noise models to detect the acoustic anomalies.

15. The method as claimed in claim 14, further comprising the control panel storing the ambient noise models for each of the gunshot sensor units in nonvolatile memory of the control panel.

16. The method as claimed in claim 14, further comprising the gunshot sensor units streaming the current audio data to the control panel.

17. The method as claimed in claim 11, further comprising identifying the acoustic anomalies by processing the current audio data against danger indicators, wherein the danger indicators represent acoustic patterns indicative of potentially dangerous situations.

18. The method as claimed in claim 17, wherein the danger indicators are associated with gunshot sounds, screaming sounds, unusually loud sounds, and/or unusually low amplitude sounds indicating obstruction of the one or more microphones of the gunshot sensor units.

19. The method as claimed in claim 11, further comprising deleting the current audio data in response to detecting no acoustic anomalies.

20. The system as claimed in claim 11, further comprising generating alerts in response to detecting the acoustic anomalies.

21. The system of claim 1, wherein the ambient noise models were previously generated based on the ambient noise captured during times when it was known that no dangerous situations were present, the previously generated ambient noise models are stored in nonvolatile memory, the current audio data depicts current ambient noise captured in real time and possibly including acoustic anomalies, and the acoustic anomalies are detected by processing the current audio data against the previously generated and stored ambient noise models.

22. The system of claim 21, wherein the processing to detect the acoustic anomalies includes generating a deviation value representing a difference between the ambient noise during the normal conditions and the current ambient noise, and detecting the acoustic anomalies based on the deviation value.

23. The system of claim 22, wherein the acoustic anomalies are detected in response to determining that the deviation value is above a predetermined threshold.

24. The system of claim 22, wherein the processing to detect the acoustic anomalies further includes generating a current model representing the current ambient noise based on the current audio data using the same process for generating the previously generated ambient noise models and comparing the current model with the previously generated and stored ambient noise model in order to generate the deviation value.

25. The system of claim 1, wherein the ambient noise models are generated during a period during which the system is placed in a learning mode and/or are continuously updated during normal operation of the system.

26. The system of claim 1, wherein each of the gunshot sensor units has its own ambient noise model representing ambient noise captured at that gunshot sensor unit's location during the normal conditions.

27. The system of claim 1, wherein the ambient noise models are generated based on variable factors for when the ambient noise was captured, including time of day, day of week, time of year, semester, month, and/or season, and/or based on known schedule information indicating times during normal operation when the ambient noise would be known to include more or less sound.

28. The system of claim 27, wherein each of the gunshot sensor units has multiple ambient noise models pertaining to the different variable factors.

29. The system of claim 1, wherein the ambient noise models are generated based on one or more condensed digital summaries of the captured ambient noise, spectrograms for an audio signal for the ambient noise, and/or quantitative representations of properties of isolated sounds and/or the ambient noise in aggregate, including frequency, duration, loudness, timbre, sonic texture, and/or spatial location.

\* \* \* \* \*